United States Patent

[11] 3,627,975

| [72] | Inventor | Hisao Goto |
| | | Osaka-fu, Japan |
| [21] | Appl. No. | 830,016 |
| [22] | Filed | June 3, 1969 |
| [45] | Patented | Dec. 14, 1971 |
| [73] | Assignee | Osaka Transformer Co., Ltd. |
| | | Osaka-fu, Japan |
| [32] | Priority | June 3, 1968 |
| [33] | | Japan |
| [31] | | 43/37505 |

[54] ARC-WELDING APPARATUS
 4 Claims, 5 Drawing Figs.
[52] U.S. Cl. ........................................ 219/131 F,
  219/135, 314/62, 314/73
[51] Int. Cl. ........................................ B23k 9/10
[50] Field of Search............................ 219/131,
  135; 314/62, 68, 69, 73

[56] References Cited
UNITED STATES PATENTS

| 15,313 | 3/1822 | Morton ..................... | 314/62 X |
| 2,282,522 | 5/1942 | Kratz............................. | 314/73 X |
| 2,636,102 | 4/1953 | Lobosco......................... | 219/131 |
| 3,049,609 | 8/1962 | Purkhiser et al.............. | 219/131 X |
| 3,143,633 | 8/1964 | Wadleigh ...................... | 219/131 X |
| 3,369,146 | 2/1968 | Adamson ...................... | 219/131 X |
| 2,806,168 | 9/1957 | Williams........................ | 219/130 X |
| 3,143,587 | 8/1964 | Buehl........................... | 13/13 |
| 3,250,894 | 5/1966 | Manz............................. | 214/131 |

*Primary Examiner*—J. V. Truhe
*Assistant Examiner*—George A. Montanye
*Attorney*—Craig, Antonelli & Hill ABSTRACT: In short circuit transfer arc welding, from among the arc voltages generated during each arcing period, those portions irregularly generated are eliminated and, subsequently, only those voltages corresponding to the arcing time are detected and, further depending upon the detected voltage, the motor for feeding the welding electrode is driven so as to feed the welding electrode that an adequate speed so as to enable the welding work to provide a uniform and acceptable final weld through the entire welding operation.

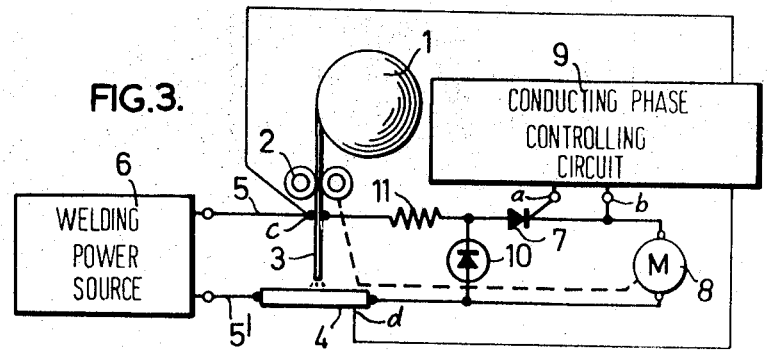
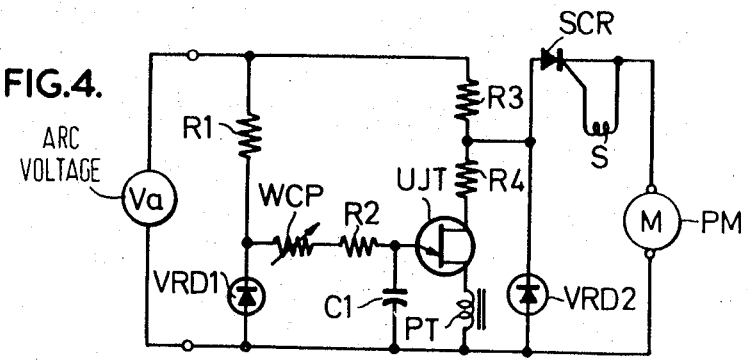
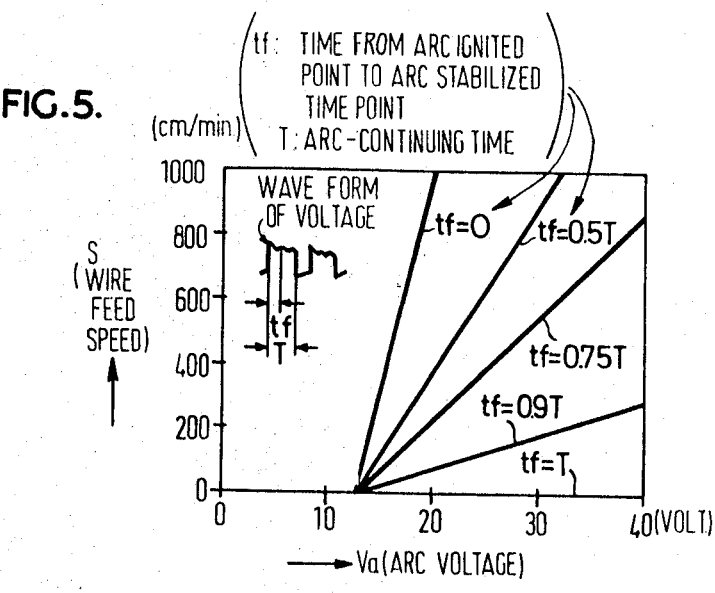

ARC-WELDING APPARATUS

This invention relates to an automatic or semiautomatic arc-welding apparatus to be used for short-circuit transfer arc welding and, particularly, to an improved structure of welding apparatus wherein the electrode-feeding speed can be accurately controlled in response to the value of arc voltage during a period in which the arc voltage is relatively stable after the arc has been established.

In conventional short-circuit transfer arc welding, it has hitherto been common practice to feed the welding electrode at preadjusted constant speed according to values of both welding current and arcing voltage, thereby causing short circuiting and arcing to be repetitively developed between the welding electrode and the work (base metal). In this instance, the applicability of the electrode-feeding speed with respect to the intended welding operation has been preadjusted with reference to such variables as welding current, arc voltage and/or the number of short circuits, prior to or during welding.

Generally, in order to obtain a molten weld, i.e., a weld of quality in short-circuit transfer arc welding, it is necessary not only to maintain at the same value, the short circuit at the time of short circuiting and the arc voltage, as well as current, during the arcing period throughout the welding operation, but also to repeat short circuiting and arcing at regular intervals, while short circuiting or arcing is maintained at an equal rate in its duration. Furthermore, it is necessary also to adjust the electrode-feeding speed to the regular alternate switching of short circuiting and arcing throughout the welding operation. However, it has long since been a problem to obtain a weld which satisfies the above-mentioned criteria with this type of welding, because of a variety of factors which detrimentally affect the welding process. Such factors include, for example, fluctuations in the output voltage of the welding power source, variations in the impedance in the welding cables and the welding current, differences in the feed rate of the electrode, which have an unavoidable influence not only upon the arc voltage between the welding electrode and the base metal, but also upon the duration of short circuit or that of arcing. With these disadvantages in conventional welding systems, it is obvious that regular repetition of short-circuiting and arcing cycle cannot be expected during welding even if the welding electrode at a fixed rate throughout the welding operation.

Moreover, when the electrode-feeding speed is constant, but the output voltage of the power supply is too low with respect to the feeding speed, or the internal impedance is excessively high, the short-circuiting current, which is to flow through the welding electrode when the welding electrode has had its tip end inserted in the molten pool, would be retarded; and consequently, it would take longer for the welding electrode tip to be transferred under the pinch effect, which in turn would lengthen the short-circuit period. Conversely, where the output voltage of the power source is too high, while the electrode-feeding speed is at a fixed rate, the arc length will be elongated; and in turn, the arcing period will be lengthened. As has been discussed above, even variations output voltage of the welding power source results in the irregular repetition of short circuiting and arcing and, accordingly, the transfer of globules (i.e. droplets) from the tip end of the welding electrode to the base metal will be hampered, or otherwise become unstable.

To eliminate the above-mentioned disadvantages inherent in conventional methods in feeding the welding electrodes, it has been proposed to detect the value of arcing voltage during the period of welding with which the electrode feed speed can be controlled so as to suit the welding conditions. However, the magnitude of the voltage detected in the proposed system is merely an average value of the voltages between the welding electrode and the base metal. Through this average value, the total time occupied by the short-circuiting periods during the entire period may be determined to some extent. However, whether or not the short-circuiting time is periodic or always of approximate equal duration cannot be predicted. Therefore, in short-circuit transfer arc welding, where the primary problem is the regular repetition of the short-circuiting arcing between the welding electrode and the work piece (base metal), the above-mentioned detected value of arc voltage is unstable, hence, this value of detected voltage cannot be directly used as a reference for controlling the regular mode of alternate repetition of short circuiting and arcing. Furthermore, neither duration of short circuiting nor that of arcing can be controlled at an accurate rate. It follows that, in conventional short-circuit transfer arc-welding systems, there have never been any successful attempts of welding through direct control of the repetition of alternate switching of short circuiting and arcing between the welding electrode and the base metal, nor direct control of the duration of short circuiting and arcing, which is essential for such a system by which the regular repetition of alternate switching of short circuiting and arcing can be effectively performed, while each duration of both of the short-circuit period and the arcing period can be maintained at an equal rate throughout the welding operation.

Another object of the present invention is to provide an automatic or semiautomatic arc-welding device wherein a controlled rectifier element and an electrode-feeding motor are connected in series between the electrode and the base metal, the controlled rectifier element being adapted to conduct after the lapse of time from the moment at which the arc has been established to the moment at which the arc voltage has been relatively stabilized, and said electrode-feeding motor is further adapted to be driven, when the controlled rectifier element has been made conductive, by a portion of the arc voltage detected during a period in which the arc voltage is relatively stable or another voltage corresponding to said arc voltage.

A further object of the present invention is to provide an automatic or semiautomatic arc-welding device wherein means is provided for eliminating fluctuations in the arc voltage during the arc-stabilized period, whereby the electrode-feeding operation can be smoothly performed by means of the electrode-feeding motor.

A still further object of the present invention is to provide an automatic or semiautomatic arc-welding device which can be manufactured at low cost with sufficient durability and is compact in its overall size.

These and other objects and advantages of this invention will become apparent from the following description made with reference to the drawings, in which:

FIG. 1 is a schematic block diagram showing an electric circuit incorporated in a welding machine in accordance with the present invention;

FIGS. 2a, b and c are respectively diagrams illustrating the waveform of the voltage generated between the welding electrode and the base metal during short-circuit transfer arc welding, waveform of the voltage to be impressed on the welding electrode feeding motor and the waveform of the pulses to be impressed on the controlled rectifier element in the circuit;

FIG. 3 is a diagram similar to FIG. 1, showing another embodiment of this invention;

FIG. 4 is a diagram of one example of circuitry corresponding to the embodiment shown in FIG. 3; and FIG. 5 shows the relation between the arc voltage and the welding electrode-feeding speed, developed in the apparatus having circuitry as illustrated in FIG. 4.

Figure 1:
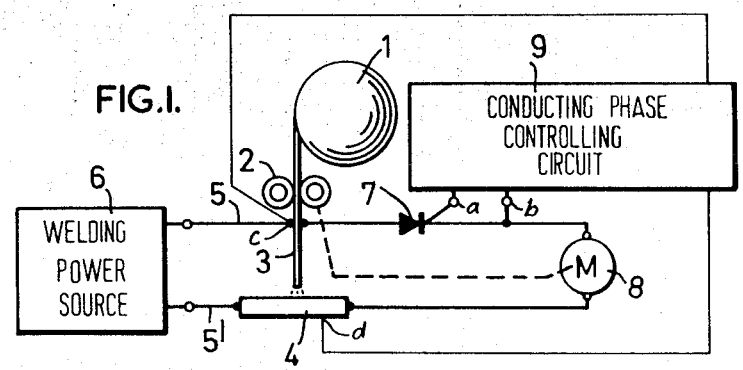

In FIG. 1 a base metal 4 and the welding electrode 3, which is to be fed toward the weld zone of the base metal by the electrode-feeding mechanism 2 from the electrode reel 1, are respectively connected to the output terminals of the welding power source 6 through the cables 5, 5′ from which the power is supplied. Also, between the electrode 3 and the base metal 4, controlled rectifier element 7 and electrode wire-feeding motor 8 are interconnected in series. This controlled rectifier element 7 is connected at its gate terminal with a terminal $a$ of a conducting phase controlling circuit 9 and at its cathode with the other terminal $b$ of said circuit 9, said controlling circuit 9 being in turn connected at its one terminal $c$ with the electrode 3 and that the other terminal $d$ with the base metal 4 so that, after said circuit 9 has detected the value of arc voltage across the arc, a pulse for firing the controlled rectifier element 7 can be generated therefrom at a suitable phase of the arc.

Figure 2:
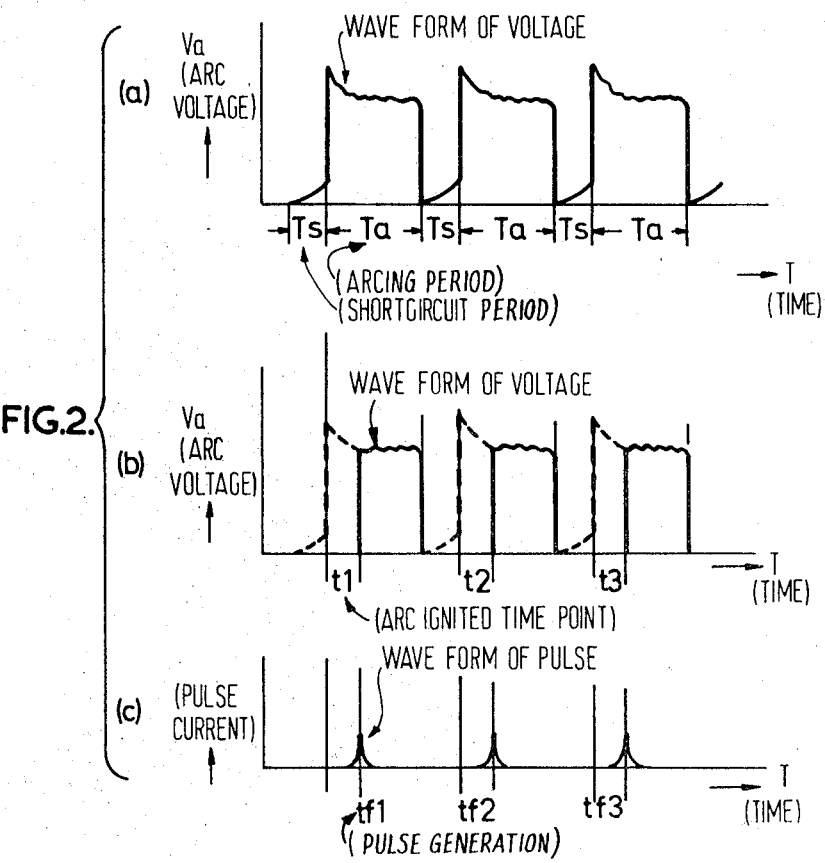

In the circuit of FIG. 1 when the input voltage is impressed on welding power source 6, power will be supplied from welding power source 6 through cables 5, 5' to welding electrode 3 and base metal 4 respectively. Between the tip end of electrode 3 and base metal 4 accordingly, short circuiting will occur to establish an arc in an alternate manner. The voltage generated between both of the above can be depicted as is shown in FIG. 2 a, wherein the abscissa represents time, while the ordinance represents voltage. The character $T_s$ represents a short-circuit period during which the arc voltage rapidly increases, while the character $T_a$ represents an arcing period during which the arc is maintained.

It has been well known that the arc voltage $V_a$, the duration of the arcing period $T_a$, as well as the duration of the short-circuit period $T_s$, usually fluxuates each time under the influence of, for example, variations in the power source and/or the extension of the electrode.

In order to eliminate these disadvantages, i.e., in order to maintain either duration of the short-circuit period or that of the arcing period at the same uniform value during the welding, control of the feeding behavior of the welding electrode 3 is necessary. Therefore the present invention provides a conduction-phase controlling circuit 9, by which a pulse may be generated after a definite time has elapsed, i.e., after the arc voltage has been relatively stabilized, which in turn is fed to the gate terminal of the controlled rectifier element 7. It is to be noted here that, with conduction-phase controlling circuit 9 according to the present invention, the time lapse between the beginning of the arcing period to the instant of pulse generation can be adjustable as desired. However, if the phase controlling circuit 9 is adjusted to generate pulses therefrom to the gate terminal of the controlled rectifier element 7 at each instant of time $tf_1$, $tf_2$, $tf_3$, etc. during the consecutive periods of welding, the controlled rectifier element 7 will commence conducting at the respective instants $t_1$, $t_2$, $t_3$, and will continue to maintain that conducting state up until the welding electrode 3 subsequently short circuits with the base metal 4. Thus, the welding electrode feeding motor 8 which is connected in series with said controlled rectifier element 7 can be impressed by the arc voltage $Va$ each period in which controlled rectifier element 7 is conducting, i.e., from the instant pulse generation until the following short circuit takes place between electrodes 3 and base metal 4.

On the other hand, during each short-circuit period, more specifically before the pulse is to be generated, the circuit is blocked by controlled rectifier element 7 which is at this time, in the nonconductive plate; hence, the electrode-feeding motor 8 is inoperative. Also, electrode-feeding motor 8 is driven by the arc voltage detected only during each period defined between the moment the arc voltage has been relatively stabilized and the moment prior to the following short circuit but not by the average value of voltages present during consecutive periods of welding. In other words, the electrode-feeding motor 8 is driven by the voltage which is directly proportional to the duration of each arcing period.

As has been described in the foregoing and illustrated in the drawings shown, with the apparatus of this invention, when the arcing period $Ta$ is long, the input voltage to be impressed on the electrode-feeding motor 8 will increase and the feeding of the electrode 3 can be speeded up, thus shortening the arcing period. On the other hand, if the arcing period is short, the input voltage to be impressed on the electrode-feeding motor 8 is lower, and hence, the feeding of electrode 3 is retarded; as a result, the arcing period time is lengthened. Thus, in this invention, the speed of the electrode-feeding is automatically regulated in accordance with the duration of each arcing period and, therefore, the present invention provides such advantageous results that the arcing period and the short-circuiting period are uniform duration and short-circuiting and arcing performed uniformly in an alternate repetition.

However, in practice, the value of arc voltage sometimes rapidly increases at the boundary between the short-circuit period and the arcing period which will result in an unfavorable weld. If the arc voltage fed to the electrode-feeding motor 8 without adjustment electric motor 8 receives a voltage which may vary and, as a result, even if the arcing periods are equal occasionally, the voltage fed to feeding motor 8 may cause a detrimental variation in the feeding speed of electrode 3. In the apparatus and process of this invention the disadvantages as above described have been entirely eliminated by the provision of the conducting phase controlling circuit 9 so designed as to generate firing pulses after a prescribed time has elapsed, from the moment that the arc has been established. More particularly, even though arcing has been established the instant $t_1$, $t_2$, $t_3$, if the firing pulse is generated after predetermined time, i.e., at the instant $tf_1$, $tf_2$, $tf_3$, etc., stabilize for the arc voltage to be established as shown so that the controlled rectifier element 7 can be brought into its conducting state at the latter instant and will continue to until welding electrode 3 subsequently is short-circuited with base material 4. Accordingly, the electrode-feeding motor 8 can be impressed with the arc voltage $V_a$ of relatively constant value after a predetermined time has elapsed from the moment that the arc has been established, so that the motor will continue to operate until the arc is extinguished. As mentioned above, the voltage to be fed to the electrode-feeding motor 8 can accurately respond to the duration of each arcing period and be consequently, the feeding of the electrode 3 can be precisely performed. It will be understood clearly that the regular alternate switching of arcing in short circuiting and the uniform maintenance of the duration of either the short-circuit period or the arcing period can be ensured.

Another embodiment of the present invention will now be disclosed. As will be clearly seen from FIG. 2 a. The magnitude of voltage $Va$ varies continuously and $b$, the magnitude of voltage $B_a$ will fluctuate continuously even during the arcing period more specifically, during the arc-stabilized period defined between the moment that the pulse has been generated to the moment that the arc is extinguished. If such arc voltage is detected without modification effected thereto, the electrode-feeding speed will be effected by such fluctuation in the arc voltage continuously. In the embodiment of the invention is shown in FIG. 3, such voltage fluctuation, even during the arc-stabilized period, can be and it is possible to control the feeding speed of the electrode 3 more accurately than in the foregoing embodiment of the present invention. In this circuit Zener diode 10 is connected between the electrode 3 and the base metal 4 through resistance 11. The Zener voltage of the Zener diode is selected to be lower than the minimum value of the arc voltage present during each arcing period. Therefore, electrode-feeding motor 8 may receive the Zener voltage of the Zener diode 10 which is to drive the motor during the period between the arc-igniting instant and the instant the arc is extinguished. By virtue of this mode of motor driving, the feeding speed of the electrode 3 can be controlled to be proportioned to the duration of the arcing period more accurately than in the first-mentioned embodiment of the present invention.

FIG. 4 depicts part of one embodiment of this invention shown in FIG. 3. In the circuit of FIG. 4, between the electrode 3 and base metal 4, to which are connected the anode of the controlled rectifier element (silicon-controlled rectifier) and one end of electrode-feeding motor PM, which is connected in series to said controlled rectifier element SCR, the series connections of resistance $R_1$ and Zener diode $VRD_1$ and the resistance $R_3$ and Zener diode $VRD_2$ are mutually connected in parallel. In parallel with Zener diode $VRD_1$, is the series connection of variable resistor WCP, resistance $R_2$ and condenser $C_1$. Between the ends of Zener diode $VRD_2$, resistance $R_4$, unijunction transistor UJT and primary windings P of the pulse transformer PT are connected in series. The ends of secondary windings S of pulse transformer PT are respectively connected to the gate terminal and the cathode of the controlled rectifier element SCR. Further, the junction point of the resistance $R_2$ and the condenser $C_1$ is connected to the emitter of said unijunction transistor. It is to be noted here that the Zener voltage of said Zener diode $VRD_2$ is set to be lower than the minimum value, for example, 17 volts, of the arc voltage as described in the foregoing. Also, a motor of which rated voltage is 12 volts is adopted for the electrode-feeding motor PM.

In the circuit so designed as hereinbefore described when the arc has been just ignited, the unijunction transistor is nonconductive because the potential of the emitter is nearly zero; hence, as there is no flow of current through pulse transformer PT, the pulse for firing the controlled rectifier element SCR is not generated. When arc voltage is applied across the resistance $R_1$ and the Zener diode $VRD_1$ the condenser $C_1$ is charged through variable resistor WCP and the resistance $R_2$. When the voltage on condenser $C_1$ has reached the predetermined value the unijunction transistor will conduct; and current will flow through the primary windings P of the pulse transformer through resistances $R_3$, $R_4$ and unijunction transistor UJT. Thereupon, the pulse, which has been generated in the secondary windings of the pulse transformer PT, is fed to the gate of the controlled rectifier element SCR, thereby causing rectifier element SCR to conduct. At that instant, the electrode-feeding motor PM receives the Zener voltage, the values of which being adjusted to be less than the predetermined value by the Zener diode $VRD_2$. Zener voltage is thus fed to the motor PM capable of heating the electrode. Once the controlled rectifier element SCR has been brought into the conductive state, such state can be maintained so long as the arc voltage is applied thereto.

It is to be observed that the voltage across the Zener diode $VRD_1$ is constant, notwithstanding variations in the values of the arc voltage during the changing of condenser $C_1$.

Accordingly, in the case when the arcing period is long, the power to be fed to the electrode-feeding motor will increase, thus causing the feeding speed of the electrode wire to increase; conversely, where the arcing period is short, the feeding speed of electrode 3 is retarded. The feeding speed of the electrode wire 3 is thus automatically adjusted to correct itself. FIG. 5 shows the interrelation between the arc voltage and the electrode-feeding speed, which is developed where short-circuit transfer arc welding makes use of the welding apparatus which has the circuits illustrated in FIG. 4. The relation sets forth the time delay ($tf$) commencing with the instant of arc-ignition and ending when the controlled rectifier element SCR becomes conductive. The arc-continuing time T is determined from the inverse ratio of the number of short circuits $n$ occurring during welding. Since the number of short circuits times in the case of ordinary welding is:

$n$=40–150 times/sec., that is, $T$=7–25 msec.

Therefore, in the case of FIG. 5, $n$=100 times/sec.

and from the above:

$T$=100 msec.

Thus, the resistance value of the variable resistor WCP is changed and further, the time delay as above mentioned is defined:

$tf$=0; $tf$=0.5$T$;

$tf$=0.7$T$; and $tf$=0.9$T$

The relation between the arc voltage and the electrode-feeding speed was calculated based on those parameters.

In addition to the advantages of its functional aspects, the apparatus of this invention is of very simple construction, and does not necessitate any attachments which have been necessitated in conventional welding apparatus, such as the power supply for the controlling device, complicated controlling cables, etc.

There is another advantage of this invention. Although the discussions have been made hereinbefore on assumption that the load of the electrode-feeding motor is always constant, consideration should be given to the cases where the load is subject to change. In the apparatus of this invention, it is possible to position the controlled rectifier element between the electrode wire and the base metal that in series with the electrode wire-feeding motor, to utilize said rectifier element as the switching means to control the opening and closing of the power supplied to said electrode-feeding motor. In this case, variations in the feeding speed due to changes in the load can be lessened, which is advantageous just as in the case of a welding operation using a semiautomatic arc-welding apparatus, wherein the welding electrode is fed by the feeding motor through a length of flexible hollow cable and emerges from the nozzle of a welding torch meters in length.

What is claimed is:

1. In a short-circuit transfer arc-welding apparatus, for applying short-circuit welds to a base metal including a welding electrode, means, having a driving motor and a source of power therefor, for feeding said welding electrode toward said base metal, and means for supplying welding power between said welding electrode and said base metal, so as to create a welding arc therebetween, whereby said electrode is fed into intermittent short circuiting and arcing contact with said base metal, the improvement comprising:

means for controlling the application of power to said drive motor of said electrode-feeding means in proportion to the period of time during which a welding arc is maintained between said base metal and said electrode, wherein said means for supplying welding power comprises means for supplying power between said welding electrode and said base metal and input power to said driving motor, and wherein said controlling means comprises means for controlling the application of input power to said driving motor in proportion to the arc ignition time between said electrode and base metal, and includes a controlled rectifier element, the control electrode of which receives control pulses generated by means for supplying ignition pulses in response to a voltage proportional to the arc ignition time between said electrode and base metal, connected between said electrode and said base metal and connected in series with said driving motor and a Zener diode connected in parallel with the series connection of said controlled rectifier element and driving motor and having a Zener voltage lower than the minimum value of voltage for maintaining a welding arc between said electrode and said base metal.

2. In a short-circuit transfer arc-welding apparatus for applying short-circuit welds to a base metal comprising:

a welding electrode;

means connected to said welding electrode and said base metal for supplying welding power thereto;

an electrode-feeding mechanism for feeding said welding electrode toward the weld zone of said base metal;

an electrode-feeding motor for driving said electrode-feeding mechanism at a variable speed corresponding to variations in the input power applied thereto;

means connected to said motor for supplying input power thereto; and means for controlling the application of input power to said electrode-feeding motor during the period of time beginning with the instant when an arc is initiated between said electrode and said base metal in response to the application of welding power from said welding power supplying means and terminating at the instant when said welding electrode becomes short circuited with said base metal, whereby said electrode is fed into intermittent short-circuiting and arcing contact with said base metal, the improvement wherein said controlling means includes:

a controlled rectifier element connected between said welding electrode and said base metal and being connected in series with said electrode-feeding motor, a conduction-phase controlling circuit responsive to the welding arc voltage between said electrode and said base metal and having its output connected to the control electrode of said controlled rectifier element for enabling the conduction of said controlled rectifier element a predetermined time after the instant when said arc is initiated between said electrode and said base metal, and a Zener diode element connected across the series connection of said controlled rectifier element and said motor so as to maintain the output of said controlled rectifier element at a constant level.

3. A welding apparatus according to claim 2, wherein said conduction-phase controlling circuit comprises a unijunction transistor oscillator, the input of which is responsive to said welding arc voltage and the output of which is connected to the primary winding of a control transformer, the secondary of said control transformer being connected to said controlled rectifier element, so as to enable the conduction of said controlled rectifier element when the unijunction transistor of said oscillator conducts.

4. An arc-welding apparatus according to claim 3, wherein the input of said unijunction transistor oscillator comprises a variable resistor for controlling the conduction delay of said unijunction transistor oscillator and wherein said unijunction transistor oscillator is connected in parallel with a Zener diode for maintaining the input to the unijunction transistor oscillator circuit constant irrespective of fluctuations of said welding arc voltage.

* * * * *